(12) United States Patent  
Craven et al.

(10) Patent No.: US 7,438,513 B2
(45) Date of Patent: Oct. 21, 2008

(54) RIBBED FASTENER

(75) Inventors: Arnold R. Craven, Chicopee, MA (US); Barry J. Hughes, Wakefield, MA (US)

(73) Assignee: Phillips Screw Company, Wakefield, MA (US)

( * ) Notice: Subject to any disclaimer, the term of this patent is extended or adjusted under 35 U.S.C. 154(b) by 0 days.

(21) Appl. No.: 11/196,435

(22) Filed: Aug. 4, 2005

(65) Prior Publication Data

US 2007/0031209 A1    Feb. 8, 2007

(51) Int. Cl.
*F16B 23/00*    (2006.01)
(52) U.S. Cl. ........................... 411/402; 411/408
(58) Field of Classification Search .............. 411/402, 411/407, 408, 409
See application file for complete search history.

(56) References Cited

U.S. PATENT DOCUMENTS

| 519,411 | A | | 5/1894 | North et al. |
| 1,936,769 | A | | 11/1933 | Olivet |
| 1,968,516 | A | | 7/1934 | Dieter |
| 2,103,944 | A | | 12/1937 | Gullborg |
| 2,133,466 | A | | 10/1938 | Purtell |
| 2,814,059 | A | | 11/1957 | Lehning |
| 3,854,372 | A | * | 12/1974 | Gutshall ........................ 411/1 |
| 4,084,478 | A | * | 4/1978 | Simmons ..................... 411/404 |
| 4,260,005 | A | * | 4/1981 | Stencel ............................ 411/3 |
| 4,361,412 | A | | 11/1982 | Stolarczyk |
| 4,373,842 | A | * | 2/1983 | Bettini et al. ............... 411/377 |
| 4,492,500 | A | | 1/1985 | Ewing |
| 4,577,402 | A | | 3/1986 | Swanstrom |
| 4,797,022 | A | | 1/1989 | Crigger |
| 4,827,756 | A | | 5/1989 | Crigger |
| 5,156,509 | A | * | 10/1992 | Wu ............................. 411/369 |
| 5,176,050 | A | * | 1/1993 | Sauer et al. .................... 81/471 |
| 5,203,742 | A | * | 4/1993 | Grady ........................... 470/63 |
| 5,879,119 | A | | 3/1999 | Robinson |
| 6,669,423 | B2 | | 12/2003 | Smith |
| 6,988,432 | B2 | * | 1/2006 | Brooks ........................ 81/439 |

* cited by examiner

*Primary Examiner*—Flemming Saether
(74) *Attorney, Agent, or Firm*—Dickstein Shapiro LLP

(57) ABSTRACT

A fastener is provided comprising a shank having a head at one end and a tapered tip at the other end, and a threaded section having a helical thread on the shank. The fastener also comprises, on the head, side surfaces for engagement with a driving tool, and wherein each of the side surfaces has at least one rib formed thereon. Also provided is a method for driving a fastener, comprising providing a shank having a head at one end, a tip at the other end, and wherein the head comprises side surfaces for engagement with a driving tool, and wherein each of the side surfaces has at least one rib formed thereon. The method further comprises providing a driving tool having driving surfaces, and driving the fastener with the driving tool by engaging the driving surfaces of the driving tool with the at least one rib of the side surfaces of the head.

6 Claims, 12 Drawing Sheets

| DATA FOR ANTI-SLIP RIB DRAWING DIMENSION REFERENCES | | | | | | |
|---|---|---|---|---|---|---|
| HEXAGON SCREW SIZE | MAX A/F | r | S = 1.155 x r | Sp | CW | Rd |
| 8 | 6.35 | 3.18 | 3.67 | 0.73 | 0.19 | 0.30 |
| 10 | 7.92 | 3.96 | 4.58 | 0.92 | 0.23 | 0.36 |
| 12 | 7.92 | 3.96 | 4.58 | 0.92 | 0.23 | 0.36 |
| 14 (1/4) | 9.53 | 4.76 | 5.50 | 1.10 | 0.23 | 0.41 |

FIG. 14

RIBBED FASTENER

BACKGROUND

The present invention relates generally to fastening systems. In particular, the present invention relates to fasteners having ribs for improved transmission of rotational forces from driving devices, and for improved penetration into work pieces.

In the industrial, remodeling and do-it-yourself ("DIY") markets for fasteners, such as self-tapping screws, fasteners having hexagon heads are widely used for a variety of applications. Such fasteners having hexagon heads can be forged for economical production in large quantities. The hexagon heads have six side surfaces joined by corners. An undesirable result of manufacturing hexagon head screws is that a large radius area is formed at the corners. This is caused because, during manufacturing, the corners cannot be fully filled during the forging operation. Such corners are referred to herein as rounded or under-filled corners.

Driving devices such as sockets or wrenches for driving the fastener are made to specific clearances with respect to the hexagon head of the fastener. Typically, a larger than desired clearance exists between the driving surfaces of the driving devices and the under-filled corners of the hexagon heads of the fasteners where the torque and rotational forces are transmitted from the driving devices to the fasteners. The rounded corners allow the socket to rotate or slip past the rounded corners of the hexagon head of the fastener. This causes a bursting stress between the rounded corners and the driving surfaces of the driving device. Bursting stress is the concentration of stress between the rounded corners of the hexagon head and the corresponding flat surfaces of the driving device when the driving device is rotated to drive the fastener. This leads to two types of failures: the driving surfaces of the driving device are worn quickly and continue to slip past the rounded corners of the hexagon head of the fastener. Subsequently the driving device may crack or otherwise fail due to the radial bursting stress. Also, the assembly secured by the fasteners can fail due to loss of constant torque from the driving device, due to the bursting stresses, which absorb some of the output torque and rotational forces. As a consequence, the seating torque of the various fasteners that hold together the assembly has a wide scatter. Subsequent degradation of the driving device results in the fastener head acting as a reamer inside the driving device and ultimately rotating freely inside the driving device, and the assembly torque is reduced to zero.

Also, in the same industries, carriage bolts with under head square portions are used. The square portions are used to prevent rotation of the bolt when it is tightened by a nut from the opposite side of the assembly. Completion of seating the bolt is made by drawing or pulling the square portion into the correct seating position in the work piece. The final seating position is normally achieved by tightening a nut onto the bolt from the other side of the assembly. Carriage bolts are typically tightened by a nut because such bolts usually have domed heads that do not provide any surfaces to be engaged by a driving device. This is due, for example, to the desire to have a low profile head.

Problems have been encountered with such carriage bolts when the conventional length of the under head square portion is not long enough to resist rotational forces transmitted by tightening of the nut. To compensate, the length of the square portions has been increased to at least the same size as the diameter of the bolt. This in turn presents another problem—it prevents the square portion from being fully driven and seated into the work piece. Often, the square portion does not have enough initial penetration into the work piece to resist the torque or rotational forces applied by the nut, which is tightened to draw or pull the square portion into final position in the workpiece. As a result of the minimal or shallow initial penetration of the square portion into the workpiece, the square portion rotates and reams the initial shallow penetration into a circular opening and ultimate assembly of the bolt fails. This situation is exacerbated when harder and higher density lumber, timber or composite material lumber are used.

What is needed are fasteners that overcome the above-discussed problems.

SUMMARY

The invention comprises providing ribs on the driven surfaces of the fastener heads. Because the ribs have narrow contact faces, the forces transmitted by the driving devices are highly concentrated and slippage is virtually eliminated between the screw head and the driving surfaces, thus preventing radial bursting stresses from occurring. This not only produces more accurate and repeatable assembly torque, but also prolongs the life of expensive driving sockets. Similar advantages are achieved when tightening or loosening hexagon head fasteners with open ended wrenches.

The invention also comprises providing ribs on the faces of the square portion of carriage bolts. Such ribs aid deeper penetration due to overall cross-section of the square portion being reduced. This facilitates a safer and more reliable penetration of the square portion when it is initially impacted into the work piece. Then, subsequent drawing or pulling of the square portion into its final seated position is made more assuredly. This is due in part to the improved engagement depth or initial penetration of the square portion having ribs formed thereon. Penetration is further enhanced because a square portion having ribs has a greater surface area than a conventional square portion without ribs. The increased surface area provides improved resistance to reaming because there is more material in shear between the ribs with counterpart valleys and the opening in the work piece.

In one aspect, the invention provides a fastener comprising a shank having a head at one end and a threaded section having a helical thread on the shank. The fastener also comprises, on the head, side surfaces for engagement with a driving tool, and wherein each of the side surfaces has at least one rib formed thereon. According to the invention, at least one rib of the ribs is deformed during transmission of rotational force from the driving tool so that driving surface of the driving tool engage all of the ribs.

In another aspect, the invention provides a method for driving a fastener, comprising providing a shank having a head at one end, a tip at the other end, and wherein the head comprises side surfaces for engagement with a driving tool, and wherein each of the side surfaces has at least one rib formed thereon. The method further comprises providing a driving tool having driving surfaces, and driving the fastener with the driving tool by engaging the driving surfaces of the driving tool with the at least one rib of the side surfaces of the head. According to the method, driving the faster causes at least one rib of the ribs to deform so that the driving surfaces engage all of the ribs.

In another aspect, the invention provides a carriage bolt comprising a shank having a threaded section and a head. The carriage bolt also comprises a square portion between the shank and the head, wherein the square portion has side surfaces, each of said side surfaces having at least one rib formed thereon.

In yet another aspect, the invention provides a method of using a carriage bolt, comprising providing a carriage bolt having a shank having a threaded section, a head and a square portion between the shank and the head, wherein the square portion has side surfaces, each of said side surfaces having at least one rib formed thereon. The method further comprises pre-drilling an opening in a work piece, inserting the shank of the bolt into the opening until the square portion contacts the work piece, and pulling the square portion into said work piece, wherein the ribs of the square portion contact the opening and operate to ease entry of the square portion into the work piece.

Another aspect of the invention comprises a nut for a fastener having an opening having internal threads for engaging with corresponding threads on a fastener, side surfaces for engaging with driving surfaces of a driving tool, and at least one rib formed on each of said side surfaces.

Therefore, fasteners and methods for using the fasteners are provided to answer a need that currently exists in the construction, remodeling and DYI industries. These and other features and advantages of the invention will be more clearly understood from the following detailed description and drawings of preferred embodiments of the present invention.

BRIEF DESCRIPTION OF THE DRAWINGS

FIG. 14 is a table showing preferred embodiments of the invention.

DETAILED DESCRIPTION OF PREFERRED EMBODIMENTS

Figure 1:
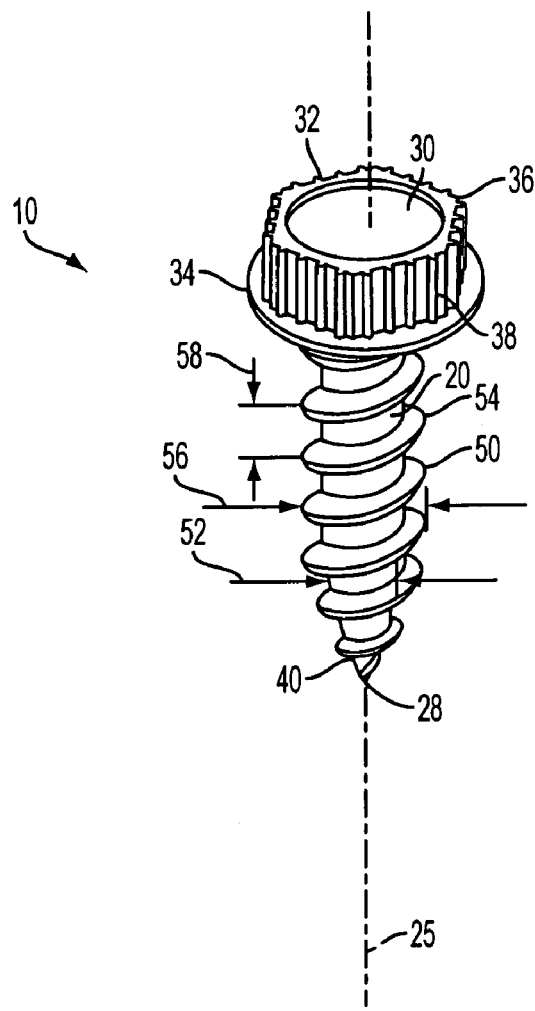
FIG. 1 is a perspective view of a fastener according to a preferred embodiment of the present invention.

Refer now to FIG. 1 there being shown a fastener, generally designated by reference numeral 10, according to a preferred embodiment of the present invention. The fastener 10 can be a bolt, a screw, or any other type of fastener. In the illustrated embodiment, the fastener 10 is a sheet metal screw. The fastener 10 includes a shank 20 extending between a head 30 and a tapered tip 40. The head is a hexagon-shaped head ("hex head"), having six side surfaces 32 interconnecting by six corners 36. The head's side surfaces 32 have ribs 38 formed thereon, which will be discussed in greater detail below. The fastener 10 has a longitudinal axis 25. In the illustrated embodiment, a flange 34 is disposed between the head 30 and the shank 20.

The shank 20 of the fastener 10 has a threaded portion 50. In a preferred embodiment, the threaded portion 50 has right-hand threads 54. The threaded portion 50 has a thread diameter 56, and a shank diameter 52. The threads on the threaded portion 50 have a pitch 58 that is defined by the axial distance from a point (usually the crest) on a thread to a corresponding point on an adjacent thread. Although the fastener 10 is shown having only one threaded portion 50, the fastener 10 may be formed with multiple threaded sections, wherein the multiple threaded sections may have threads having various pitches and thread angles, as disclosed in U.S. Pat. No. 6,666,638, the entire disclosure of which is incorporated by reference herein.

The threaded portion 50 extends to the tip 40 and a point 28. The point 28 is essentially a sharp end to the shank 20. The tip 40 is illustrated as being tapered for example only. High tensile machine screws and bolts, with and without washer flanges, suffer as much if not more from the problems discussed above due to the disparity in hardness between the fastener material and the material of the driving tools. Thus, the invention is equally as applicable and includes machine screws and bolts that do not have a tapered tip. As illustrated in FIG. 1, the tapered tip 40 is manufactured to be decreasing in diameter from the shank diameter 52 to the point 28. The threads 54 of the threaded portion 50 are conventionally manufactured to continue onto the tapered tip 40 and to end at the point 28. The threaded portion thread diameter 56 decreases at the tapered tip 40 and comes to an essentially sharp end on point 28. The threads 54 on the tapered tip 40 and point 28 may be manufactured to be self-tapping threads. Self-tapping threads reduce the need to pre-drill holes in a work piece.

Figure 2:
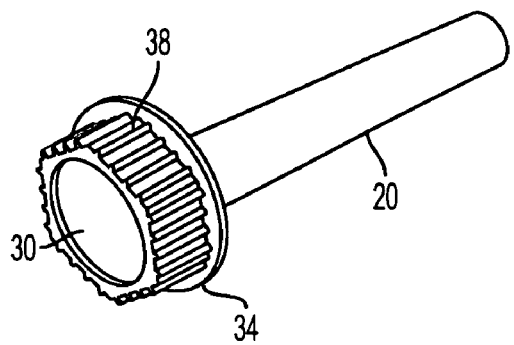
FIG. 2 is a perspective view of the fastener of FIG. 1 at a previous stage of manufacturing.

The fastener 10 can be manufactured from a blank having the head 30 and shank 20, as shown in FIG. 2, which may initially be uniform in diameter. The blank, which may be made form steel, aluminum, or other material, can be deformed by a thread rolling machine to achieve the form illustrated in FIG. 1. The head 30, ribs 38 and flange 34 may be formed by forging, or any other suitable manufacturing process. During the rolling and/or forging processes, the fastener 10 may receive properties that help increase the fastener's fatigue strength and loading strength.

Figure 3:
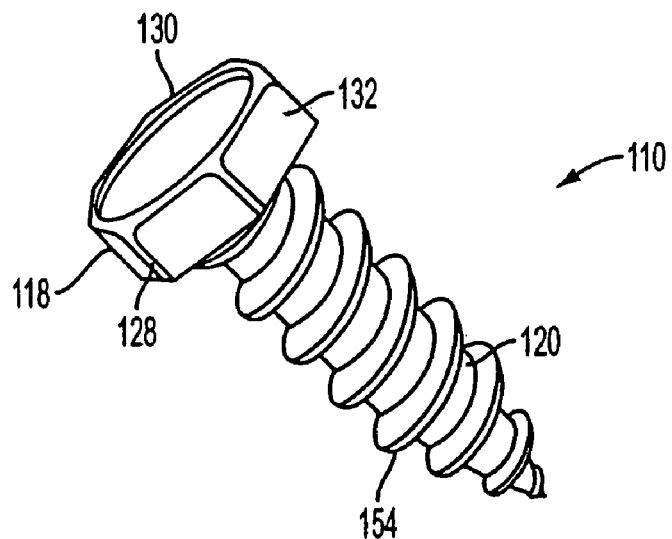
FIG. 3 is a perspective view of a conventional fastener.
Figure 4:
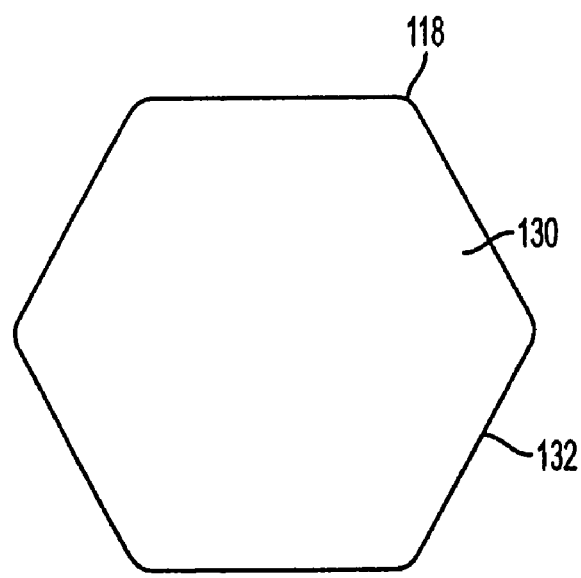
FIG. 4 is a top view of the fastener of FIG. 3

The head 30 of the fastener 10 will now be described in greater detail. As discussed above, the head 30 has side surfaces 32 that have ribs 38 formed thereon. A conventional fastener, without ribs 38, is shown in FIG. 3. The conventional fastener 110 has a shank 120 and a thread section 154 formed thereon. The conventional fastener 120 has a hex head 130. The hex head 130 has six side surfaces 132 interconnected by corners 128. The hex head 130 of the conventional hex head 130 has rounded corners 118. The rounded corners 118 are formed, usually as un unwanted byproduct of manufacturing, because hex head fasteners 110 are typically formed from hexagon bars that are forged for economical production. When such hexagon bars are forged, the corners typically cannot be fully filled to create a hexagon bar with filled in, or sharp corners. The rounded corners 118 are so-called under-filled portions of the head 130. FIG. 4 shows a top view of the hex head 130 of the conventional fastener 110.

Figure 5:
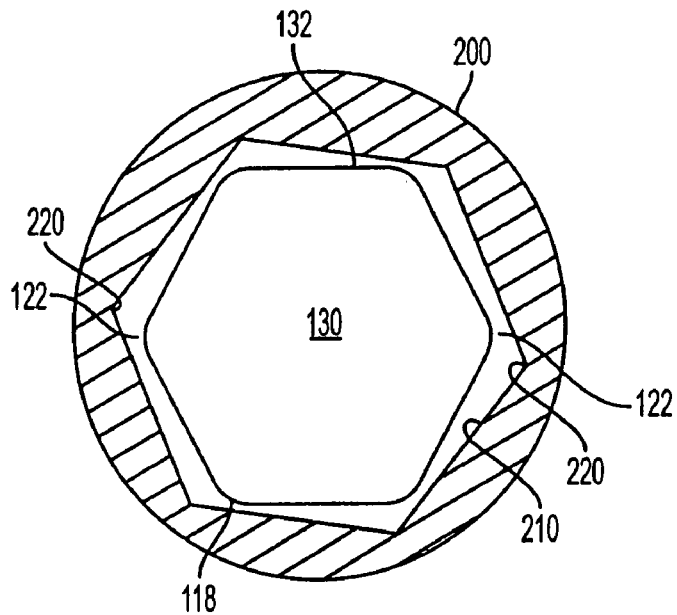
FIG. 5 is view of the fastener of FIG. 3 in use.
Figure 6:
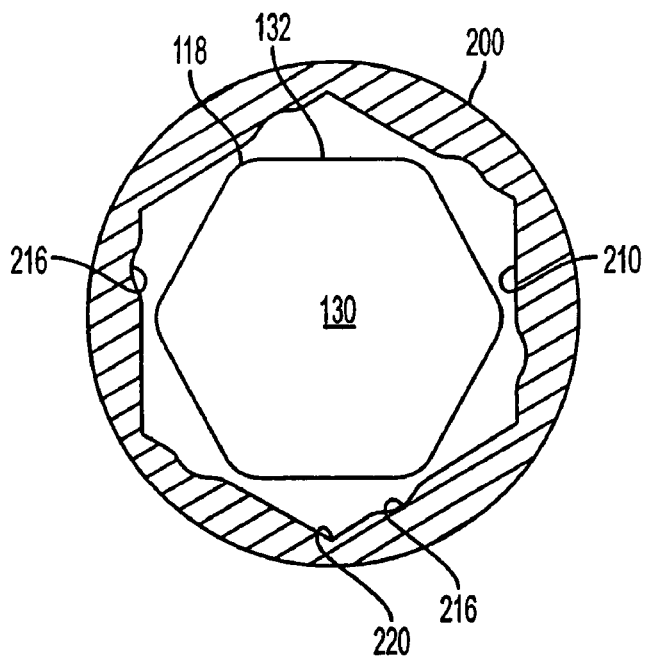
FIG. 6 is view of the fastener of FIG. 3 in use.

Refer now to FIGS. 5 and 6 that show the head 130 of conventional fastener 110 in use, while being tightened by a socket 200. The socket 200 has six internal surfaces 210 designed to engage with and transmit rotational force to the side surfaces 132 of the head 130. The internal hexagon opening of the socket 200, formed by internal surfaces 210, is slightly larger, due to clearance requirements, than the hex head 130 of the fastener 110. This differential is required so that the socket 200 fits onto the head 130.

Because the rounded corners 118 are under-filled, as discussed above, a larger than desired clearance 122 is exists between the rounded corners 118 of the head 130 and the internal corners 220 and surfaces 210 of the socket 200. This larger than desired clearance 122 is generated in the area where the torque and rotational forces are transmitted from the socket 200 to the head 130 of the fastener 110. This is due to bursting stress—the stress between the rounded corners 118 of the hex head 130 and the internal surfaces 210 of the socket 200. Continued rotational force applied to the socket 200 may lead the internal corners 220 and surfaces 210 of the socket 200 to continually slip past the rounded corners 118 of the head 130. This condition is shown in FIG. 6.

The slipping of the internal corners 220 and surfaces 210 of the socket 200 past the rounded corners 118 of the head 130 leads to two types of failures. First, the internal surfaces 210 of the socket 200 are worn quickly and become more likely to slip past the rounded corners 118 of the hex head 130. The socket 200 may subsequently develop worn out areas 216, which may cause the socket 200 to crack or otherwise fail. Worn out areas 216 lead to reduced rotational force being transmitted between the socket 200 and the fastener 110. Second, an assembly held together by the fasteners 110 can fail due to loss of constant or continuous torque transmitted by the socket 200 because some of the torque is lost when the socket 200 slips past the head 130. As a consequence, there is a lot of variance in seating torque among the many fasteners that secure the assembly, which can lead to degraded stability and, ultimately, failure of the assembly.

Figure 7:
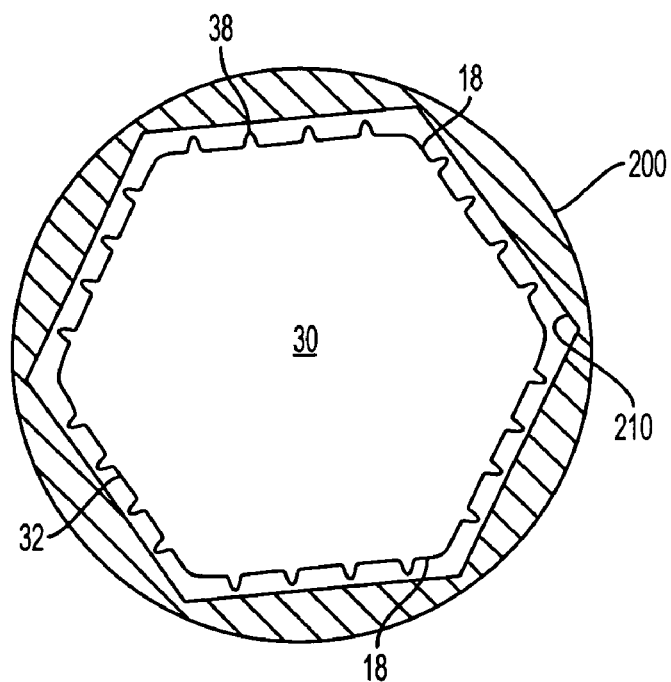
FIG. 7 is a view of the fastener of FIG. 1 in use.
Figure 8:
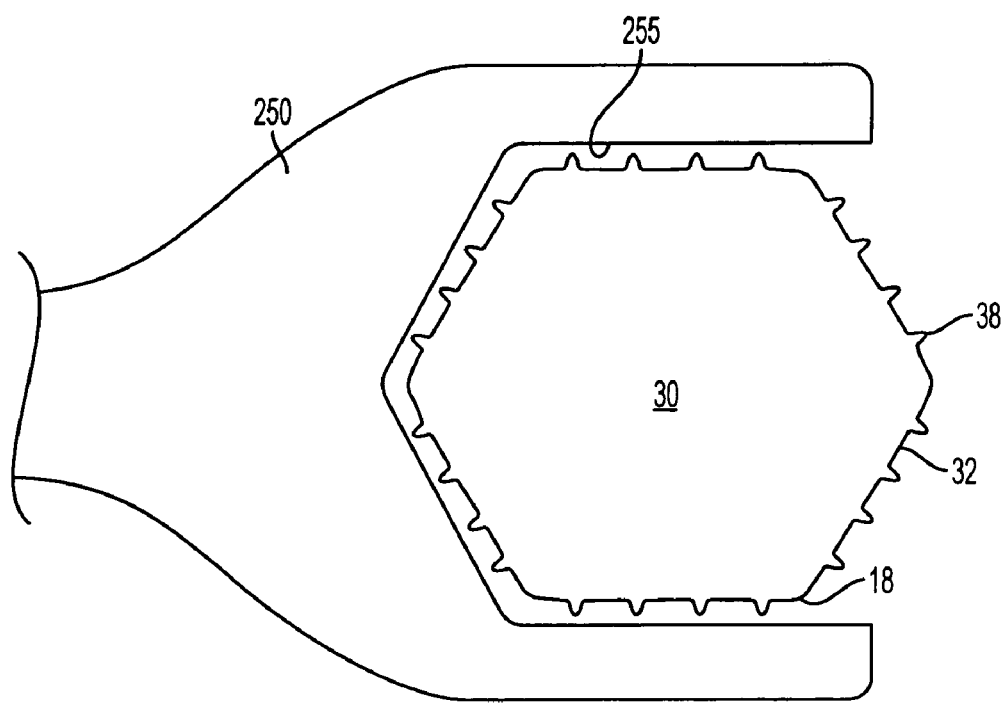
FIG. 8 is a view of the fastener of FIG. 1 in use.

These problems are alleviated by the embodiments of the present invention. With reference to FIGS. 1, 7 and 8, the head 30 of the fastener 10 of the present invention has ribs 38 formed on the side surfaces thereof. The ribs 38 are formed between the rounded corners 18 of the head 30 in a preferred embodiment. The under-fill problem of the rounded corners 18 is eliminated because rotational torque is transmitted to the head 30 through the ribs 18 rather than through the rounded corners 18. FIG. 7 shows internal surfaces 210 of socket 200 in contact with the ribs 18 of the head 30, and FIG. 8 shows internal surfaces 225 of an open wrench 250 in contact with the ribs 18 of the head 30. Because the ribs 18 have a narrow contact face, which will be discussed in greater detail below, transmitted rotational forces are highly concentrated and slippage is virtually eliminated between the head 30 and the internal surfaces 210, 255 of the driving tools. The above-discussed potential problems are thereby prevented because the internal surfaces 210, 255 of the driving tools do not contact the rounded corners 18 of the head 30.

Figure 9:
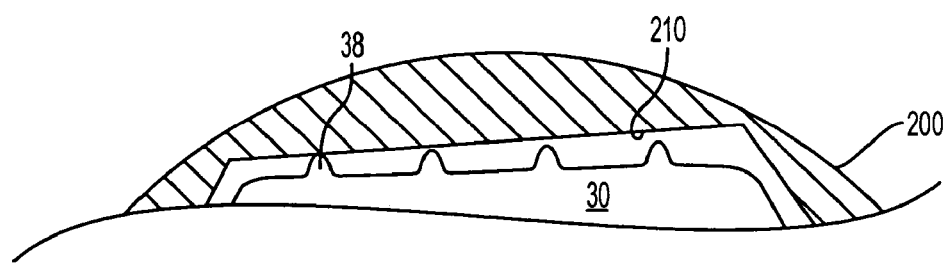
FIG. 9 is a view of the fastener of FIG. 1 in use.
Figure 10:
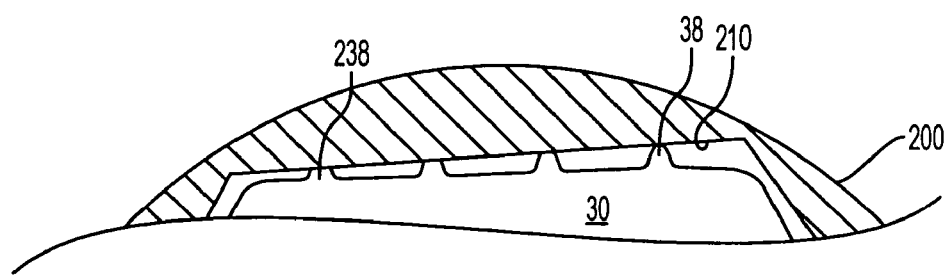
FIG. 10 is a view of the fastener of FIG. 1 in use.

Engagement of the driving surfaces with the ribs is illustrated in greater detail with reference to FIGS. 9 and 10. FIG. 9 is a close up view of a portion of FIG. 7, showing one internal surface 210 of the driving device 200 engaged with the hex head 30. FIG. 9 illustrates the initial stages of transmittal of rotational force from the socket 200 to the head 30. As shown, at the initial stage, the internal surface 210 is in contact with one rib 38. Referring to FIG. 10, as rotational force is continually transmitted, or increased, the internal surface 210 of the socket 200 engages more ribs 38 because the rib 38, which was initially contacted by the internal surface 210, is now partially crushed or deformed into rib 238. The crushing or deformation is due to the material of the head 30 being softer than the material of the socket 200. This partial crushing or deformation enables the internal surface 210 to come into contact or engage additional ribs 38. The engagement of the internal surface 210 with multiple ribs 238, 38 enables the socket 200 to transmit the rotational forces and torque evenly over the surface of the head 30. Thus, rather transmitting rotational forces through one contact point (the rounded corner) at each internal surface 210 and causing a build up of bursting stresses, the invention allows transmission of forces through several ribs 38, 238. This spreads the rotational forces about the head 30, and solve the aforementioned problems. The embodiments of the invention not only produce more accurate and repeatable assembly torque, but also prolong the life of expensive sockets, wrenches or other driving tools.

Figure 11:
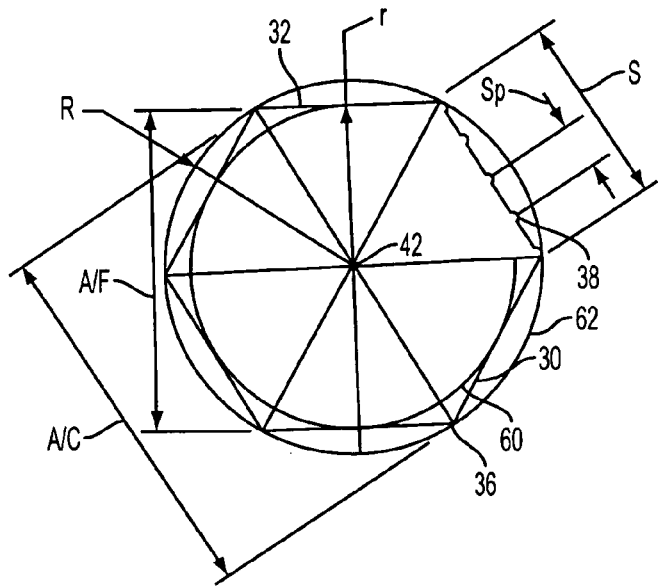
FIG. 11 is a drawing representing the top view of the fastener of FIG. 1.
Figures 12, 13:
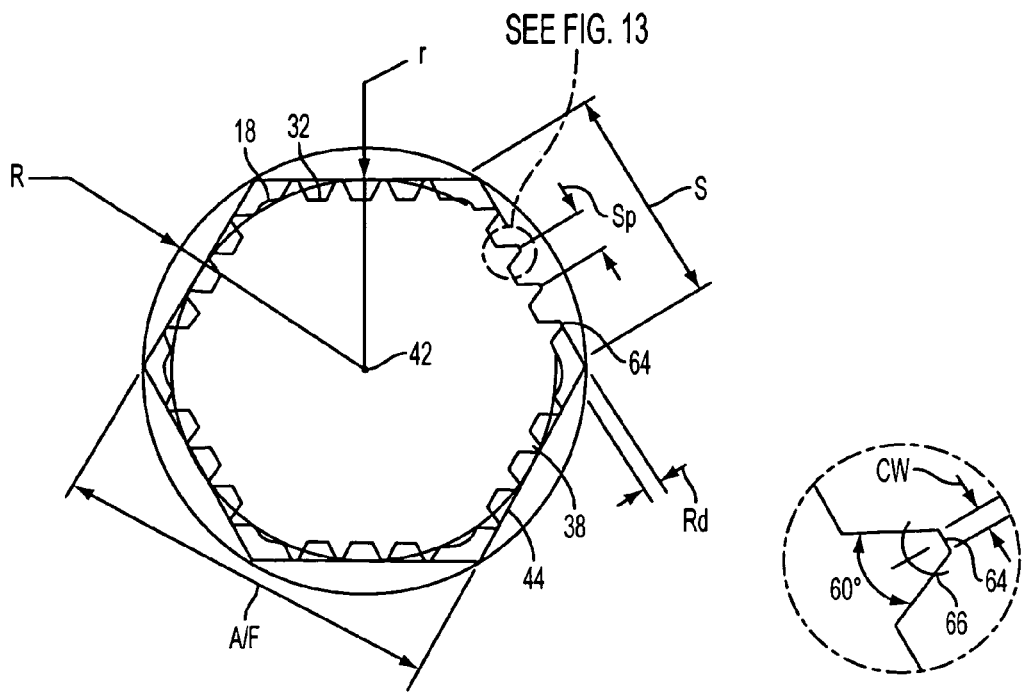
FIG. 12 is a drawing representing the top view of the fastener of FIG. 1.
FIG. 13 is a drawing representing an element of the top view of the fastener of FIG. 1.

Arrangement and sizing of the ribs 38 will now be discussed with reference to FIGS. 11-14. The number, shape and size of ribs 38 on each side surface 32 can be determined to meet various industrial or DIY application requirements. In one embodiment of the invention, four ribs 38 are formed on the side surface 32 of the hex head 30. FIGS. 11 and 12 show a representation of a hex head 30 with superimposed geometrical shapes. FIGS. 11 and 12 show the hex head 30 with an internal (or inscribing) circle 60 having a radius r and an external (or circumscribing) circle 62 having a radius R The internal circle 60 is drawn inside the hex head 30 and connects midpoints of side surfaces 32. The external circle 62 is drawn outside the hex head 30 and connects the corners 36 of the hex head 30. The internal and external circles 60 and 62 have a common center 42. As discussed above, in actual versions of the hex head 30, rounded corners 18 rather than sharp corners 36, as shown in FIGS. 11 and 12, are formed as a byproduct of manufacturing techniques.

In the embodiment show in FIGS. 11 and 12, the side surfaces 32 have a length S, and each rib 38 is separated from the adjacent rib 38 by a distance Sp. In the illustrated embodiment, the ribs 38 are generally triangular in shape. Referring to FIG. 13, the ribs 38 have a crest 64 that has a crest width CW. The ribs 38 also have a crest angle 66, which in a preferred embodiment is approximately 60 degrees. The ribs 38 have a height Rd. As best seen in FIG. 12, the ribs 38 extend outward from center 42 approximately the same radial distance as flat side surfaces 44 of a conventional hex head would extend. The head 30 has an "across flats" dimension A/F, and an "across corners" dimension A/C. The A/C dimension is useful when determining the size requirement of a bored hole to countersink a screw.

An exemplary procedure for designing a hexagon head screw in accordance with the invention will now be describe. The maximum A/F dimension of the head 30 is determined first. For a chosen maximum A/F dimension for a hex head, the minimum A/F dimension would be the maximum dimension minus 0.18 millimeters. After the across flats dimension A/F is known, radius r of the internal (or inscribing) circle 60 is determined from the following equation:

$$r = A/F \times 0.5$$

Once r is known, the length S of the side surfaces 32 is determined from the following equation:

$$S = r \times 1.155$$

S is also equal to radius R of the external (or circumscribing) circle 62. After S is determined, the distance Sp separating each rib 38 is determined. The distance Sp also determines the number of ribs that will be formed on each side surface 32. In a preferred embodiment, the distance Sp is determined by the following equation:

$$Sp = S/5$$

According to this equation, each side surface 32 will have four ribs 38 formed thereon. The equation for determining Sp can be altered to suit different applications and sizes of hex head screws. For example, if the distance S exceeds 12 millimeters, it is preferable that Sp=S/6. As such, not only are more ribs 38 formed on each side surface 32, but also the spacing Sp between each rib 38 does not become too large and even load distribution is maintained across the side surface 32.

Next, the crest width CW and height Rd of the ribs 38 are determined. The crest width CW is preferably should not exceed 0.23 millimeters in width to enable the partial crushing or deformation of the ribs 38 as discussed above. The height of the ribs 38, in the preferred embodiment, is typically set at between 35% and 40% of the rib spacing dimension Sp. FIG. 14 is table showing data, in millimeters, for the above-discussed rib parameters for some common sizes of hex head screws in accordance with preferred embodiments of the invention.

Figure 15:
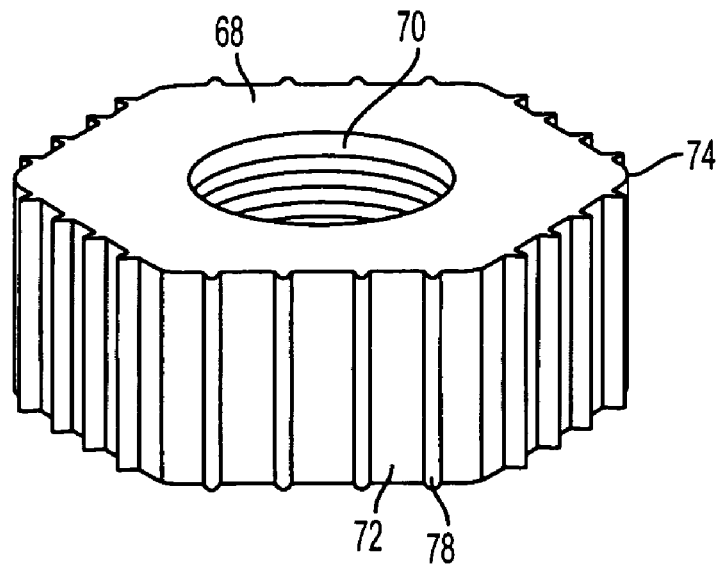
FIG. 15 is a perspective view of a nut according to a preferred embodiment of the invention.
Figure 16:
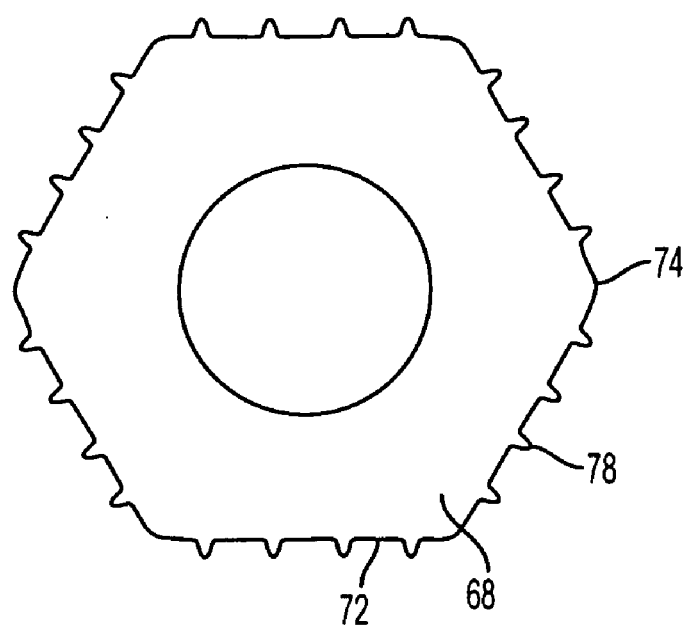
FIG. 16 is a top view of the nut of FIG. 13.
Figure 17:
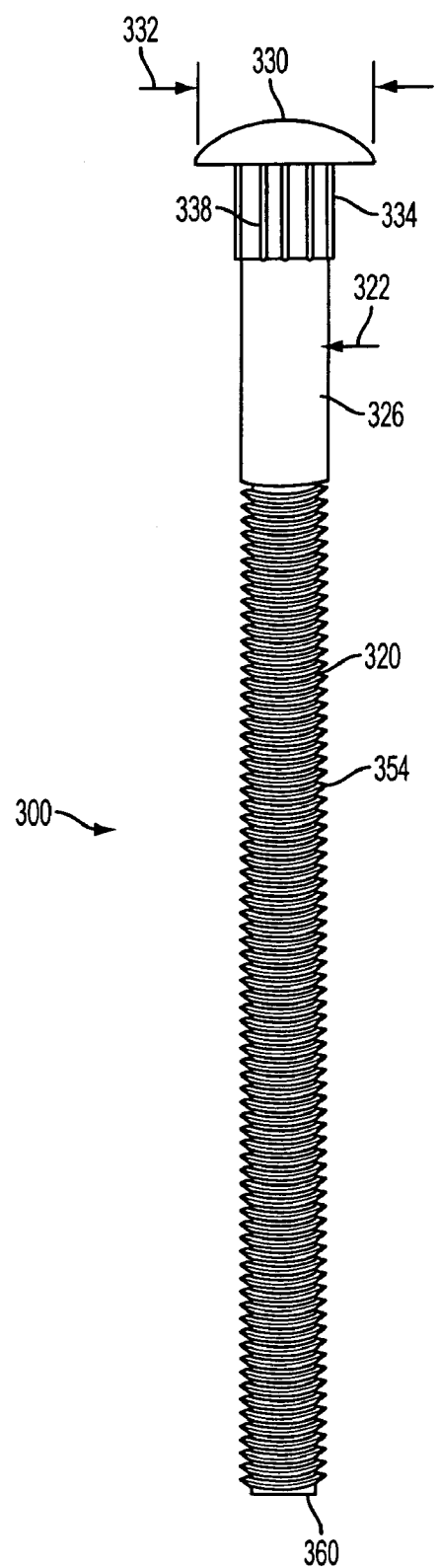
FIG. 17 is a side view of a fastener according to another preferred embodiment of the present invention.

Although the invention has thus far been discussed with respect to a hex head fastener, the invention is also applicable to a hex nut for use with a bolt-type fastener. Referring to FIGS. 15 and 16, a hex nut 68 is shown having side surfaces 72 connected by rounded corners 74. The nut 68 has internal threads 70 for engaging with corresponding threads on a fastener. The nut 68 has ribs 78 formed on its side surfaces 72, in accordance with the design considerations discussed above with respect to ribs 38 formed on hex head 30. The nut 68, having ribs 78, enjoys similar benefits as discussed above with respect to the hex head 30 with ribs 38. Namely, because the ribs 78 have a narrow contact surface, pressure transmitted to the ribs 78 from a driving tool is highly concentrated, and slippage is virtually eliminated Refer now to FIG. 17 that shows a fastener, generally designated by reference numeral 300, according to another embodiment of the present invention. The fastener 300 is shown as a carriage bolt, but can be another type of fastener. The fastener 300 has a head 330 that has a diameter 332. The fastener 300 has a shank 320 having threads 354 formed thereon. The shank 320 also has an unthreaded portion 326 that has a diameter 322. Between the head 330 and shank 320 is disposed a square portion 334. In use, the square portion 334 is typically pulled or pushed (e.g., hammered) or otherwise driven into a working material such as a piece of lumber or composite lumber. Once driven into the working material, the square portion 334 functions to prevent rotation of the fastener 300 when a nut (not shown) is tightened onto end 360 of the fastener 300.

Figure 18:
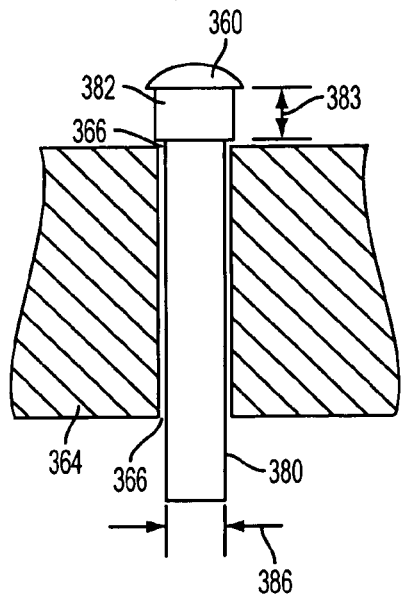
FIG. 18 is view of a conventional fastener in use.
Figure 19:
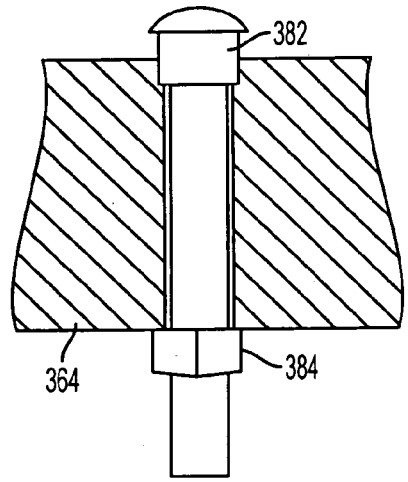
FIG. 19 is view of a conventional fastener in use.
Figure 20:
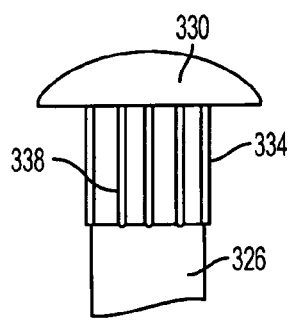
FIG. 20 is a detailed view of the fastener of FIG. 15.

Carriage bolts are typically used in working materials such as wood or composite lumber, and as shown have a domed head and a square portion under the head. The domed heads on carriage bolts are useful in applications where a low profile head is desirable. In using a conventional carriage bolt, with reference to FIGS. 18 and 19, a hole 366 is pre-drilled into the work piece 364, and a conventional carriage bolt 380 is inserted into the hole 366. Insertion of the carriage bolt is stopped when the square portion 382 comes into contact with the work piece 364 because the square 382 is larger than the opening 366. At this stage, the conventional carriage bolt 380 is further inserted into the work piece 364 by tightening the nut 384 onto the threads of the carriage bolt 380. Tightening of the nut 384 pulls the bolt 380 into the work piece 364. The bolt 380 is pulled into the work piece 364 by forcing the square portion 382 into the opening 366 and thereby deforming and enlarging the opening 366 to accommodate linear movement of the square portion 382. The square portion 382 is wedged into the opening 366 and moves linearly while rotation of the bolt 380 is prevented by surfaces of the square 382 coming into abutting or frictional contact with the opening 366.

Several problems are encountered during the above-described insertion of a conventional carriage bolt 380 into a work piece 364. For example, when the square portion 382 is driven into the work piece 364, the depth or length 383 of the square portion 382 may not be large enough to resist rotation of the bolt 380 inside the opening 366. When this occurs, continued rotation of the nut 384 will simply cause the bolt 380 to spin inside the opening 366. To compensate for this problem, the length 383 of the square portion 382 has been increased to at least equal the diameter 386 of the bolt 380. This, in turn, presents another problem—due to the increased length 383 of the square portion 382, the square portion 382 is prevented from being fully driven and seated into the work piece 364. This is due to excessive friction between the square portion 382 and the work piece 364, and also due to resistance to deformation of the work piece 364. Yet another problem encountered by the conventional carriage bolt 380 is that the square portion 382 may not have enough initial penetration into the work piece 364 to resist the torque and rotational forces from the nut 384, which is tightened to draw the square 382 into the work piece 364. As a result, the initial shallow penetration of the square portion is reamed into a circular opening and ultimate assembly of the bolt fails. This situation is exacerbated when harder and higher density lumber, timber or composite material lumber are used as the work piece 364.

Figure 21:
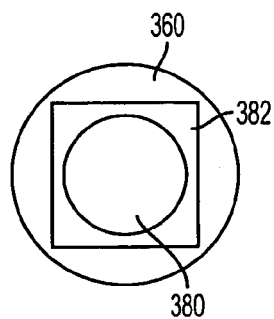
FIG. 21 is a bottom view of a conventional fastener.
Figure 22:
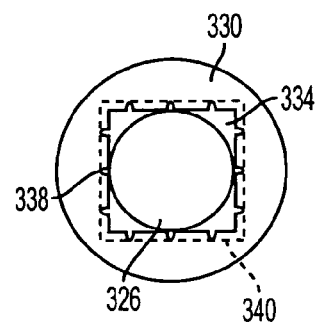
FIG. 22 is a bottom view of the fastener of FIG. 15.

The aforementioned problems affecting conventional carriage bolts 380 are resolved by the present invention. With reference to FIGS. 17 and 20-22, vertical ribs 338 are formed on the faces of the square portion 334. The vertical ribs 338 aid in penetration of the square portion 334 into the wrok piece 364 due to overall cross-section of the square being reduced, as illustrated in FIGS. 21 and 22. The conventional carriage bolt 380 is shown, as viewed from the bottom, in FIG. 21, and the carriage bolt 300 of the invention, as viewed from the bottom, is shown in FIG. 22. The square portion 334 of the bolt 300 of the invention is formed with ribs 338, and, thus can be made smaller than the square portion 382 of the conventional bolt 380. In FIG. 22, dashed lines 340 represent the outward extent of the ribs 338 from the square portion 334, and also represent the approximate size of the conventional square portion 382.

Figure 23:
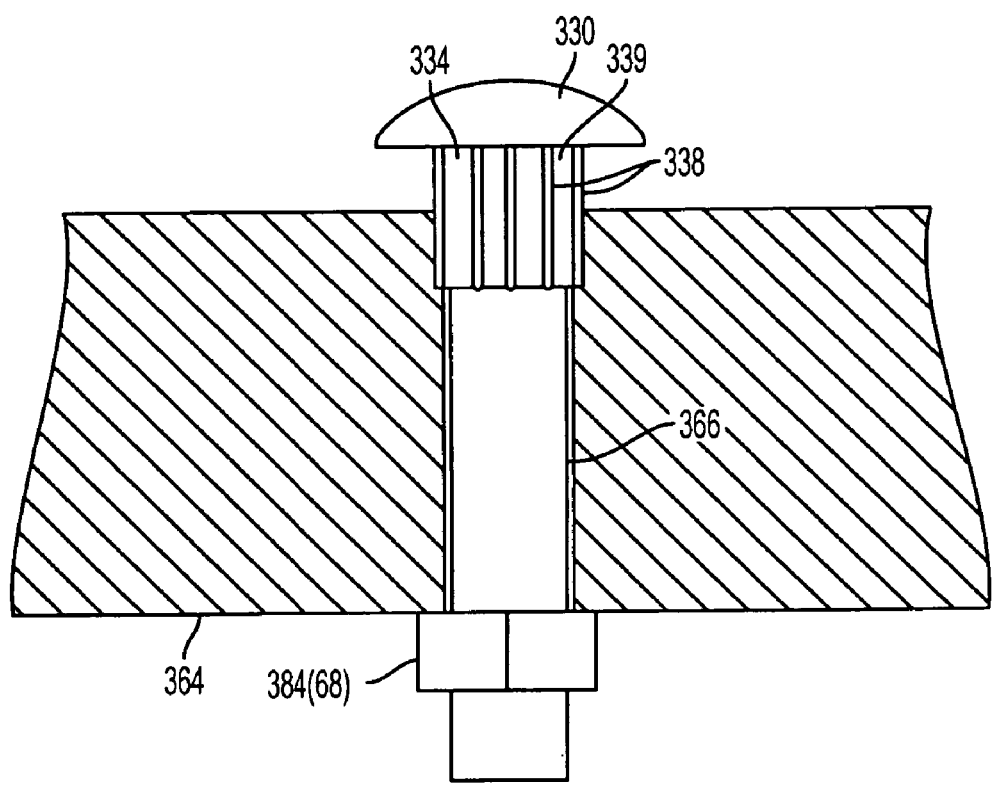
FIG. 23 is a view of the fastener of FIG. 15 in use.

Thus, the length of the side surfaces of the conventional square portion 382 can be reduced. With reference to FIG. 23, this reduced square portion 334 on the bolt of the invention allows an easier and more reliable penetration of the square portion 334 into the work piece 364 when the square portion 334 is initially pulled (or pushed) into the hole 366 in the work piece 364. The nut 68 of the invention discussed above can also be used with carriage bolt 300. Then, insertion of the square portion 334 into its final seated position in work piece 364 is accomplished assuredly due to the increased initial penetration and improved engagement depth of the square portion 334. In addition, the faces of the square portion 334, having ribs 338, have a greater surface area than flat faces without ribs. The increased surface area provides improved resistance to reaming due to extra material in shear between the ribs 338 and the increased contact area around the ribs 338 and their in-between valleys 339. Although the disclosed embodiment shows three ribs 338 formed on each side of the square 334, a different number of ribs 338 may be formed, by forging, for example, without departing from the spirit and scope of the invention.

Figure 24:
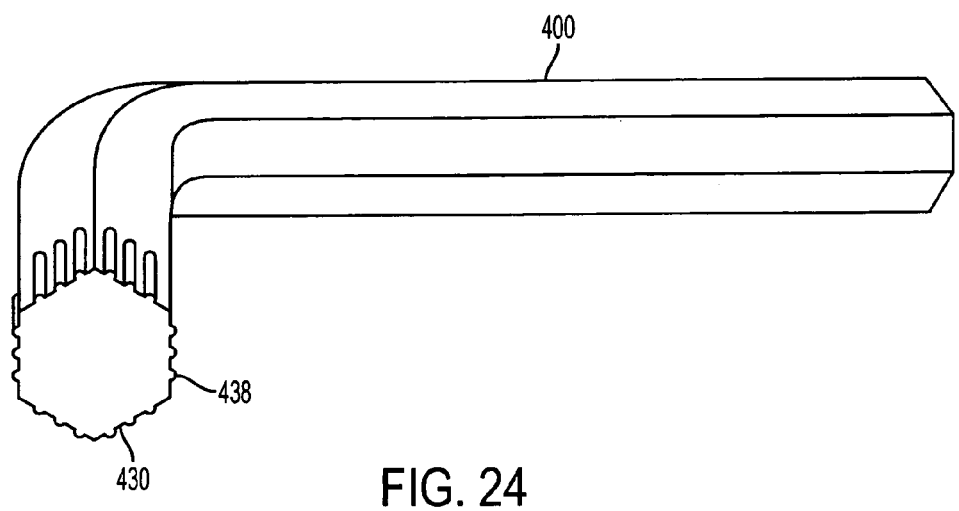
FIG. 24 is a perspective view of a driver according to a preferred embodiment of the present invention.
Figure 25:
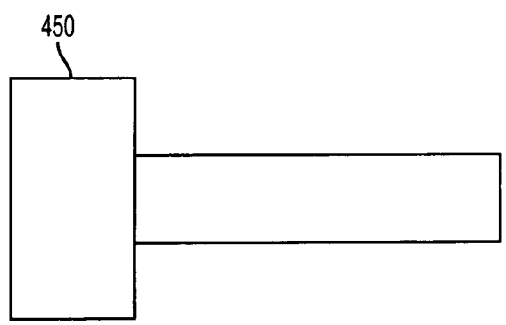
FIGS. 25 and 26 are side views of a fastener according to a preferred embodiment of the present invention.
Figure 26:
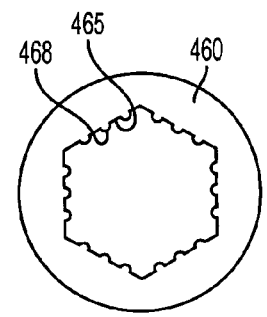

Refer now to FIGS. 24-26 that show additional embodiments of the invention. FIG. 24 illustrates a hexagon driver 400 for driving fasteners having internal hexagon surfaces. The hexagon driver 400 has ribs 438 formed on the driving surfaces 430 thereof. FIG. 25 shows a hexagon socket type fastener 450, and FIG. 26 shows a head 460 of the fastener 450. The head 460 has internal surfaces 465 having ribs 468 formed thereon. The wrench 400 having ribs 438 may be used with a conventional socket-type fastener having no ribs formed on internal surfaces thereof, and the fastener 450 having ribs 468 may be used with a convention hexagon driver having no ribs formed on the driving surfaces thereof. Such combinations enjoys the same benefits discussed above with respect to fastener having ribs 38.

The above description and drawings are only illustrative of preferred embodiments of the present inventions, and are not intended to limit the present inventions thereto. For example, although the ribs 18 are illustrated as being generally triangular in shape, the ribs 18 may have parallel sides, or have other shapes. Although the invention is described with reference to hex head screws, it is also applicable to screws having a different number of sides. Any subject matter or modification thereof which comes within the spirit and scope of the following claims is to be considered part of the present inventions.

What is claimed as new and desired to be protected by Letters Patent of the United States is:

1. A fastener comprising:
   a shank having a head at one end;
   a threaded section having a helical thread on said shank;
   wherein said head comprises side surfaces, and wherein each of said side surfaces has at least two deformable ribs formed thereon, wherein said at least two deformable ribs are deformable by a force transmitted by a driving surface of a driving tool,
   wherein said at least two deformable ribs are generally triangular ribs having a base and a crest, said crest having a generally flat surface portion, and
   wherein said generally flat surface portions of said at least two deformable ribs each have a contact face, and wherein said force from said driving tool is transmitted to said fastener through said contact faces.

2. The fastener of claim 1, wherein said fastener is a sheet metal screw having a flange between said head and said helical thread.

3. The fastener of claim 1, wherein said generally flat surface portion is approximately 19 mm to 23 mm.

4. The fastener of claim 1, wherein each said side surface has a length; and said at least two deformable ribs have a distance therebetween, said distance being approximately one fifth of said length of said side surfaces.

5. The fastener of claim 1, wherein said at least two deformable ribs have a crest angle, and wherein said crest angle is approximately sixty degrees.

6. The fastener of claim 1, wherein said at least two ribs have a height and are spaced apart by a distance, said height being approximately between 35 and 40 percent of said distance.

* * * * *